United States Patent [19]
Pearl

[11] 4,088,623
[45] May 9, 1978

[54] COATINGS THAT REDUCE FLOW RESISTANCE AND TURBULENT DRAG AT THEIR INTERFACE WITH LIQUIDS

[75] Inventor: Harry A. Pearl, Middletown, R.I.

[73] Assignee: The United States of America as represented by the Secretary of the Navy, Washington, D.C.

[21] Appl. No.: 700,373

[22] Filed: Jun. 28, 1976

[51] Int. Cl.² .......................... C08L 63/00; B63B 1/34
[52] U.S. Cl. .................... 260/37 AL; 114/67 R; 260/45.95 C; 260/823; 260/830 TW; 264/122
[58] Field of Search ............. 106/38.22; 260/45.95 C, 260/18 R, 823, 37 AL, 830 TW; 114/67 R, 20; 132/13; 264/122

[56] References Cited

U.S. PATENT DOCUMENTS

| | | | |
|---|---|---|---|
| 3,382,831 | 5/1968 | Madison | 114/20 R |
| 3,530,069 | 9/1970 | O'Neill | 260/45.95 C |
| 3,720,216 | 3/1973 | Wartman | 137/13 |
| 3,843,589 | 10/1974 | Wartman | 137/13 |

Primary Examiner—Lorenzo B. Hayes
Attorney, Agent, or Firm—Richard S. Sciascia; Arthur A. McGill; Prithvi C. Lall

[57] ABSTRACT

Coating formulations and method of making thereof for reducing the drag or friction encountered at the interface of a soluble drag reduction material coating and the liquid medium such as water in which the coating is being used. This is accomplished by adding various solid water-soluble materials as diluents and viscosity reducers, to a very high molecular weight drag reduction non-ionic polymer such as that of polyethylene oxide. The molded polymer with the added solid water-soluble material has less solubility and viscosity at and contiguous to the coating-water interface than that of the additive-free matrix under similar conditions.

3 Claims, 1 Drawing Figure

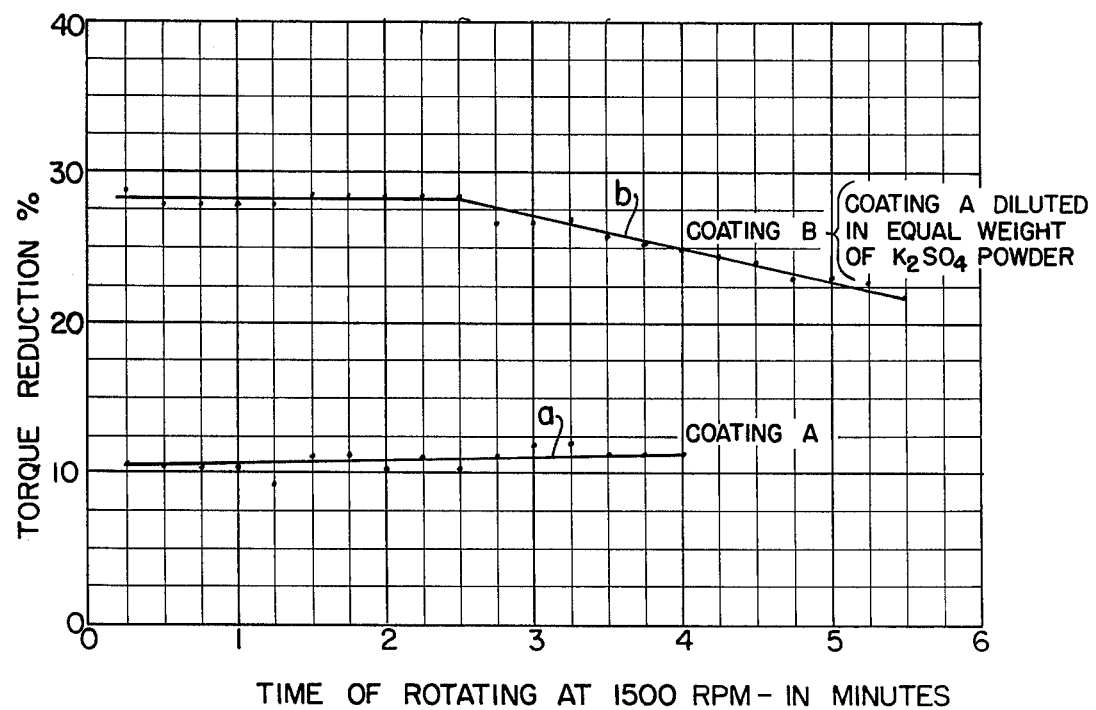

COATINGS THAT REDUCE FLOW RESISTANCE AND TURBULENT DRAG AT THEIR INTERFACE WITH LIQUIDS

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

This invention relates to drag reduction coatings and more particularly to coatings for reducing flow resistance and turbulent drag at the interface of the coating with the liquid and down stream of the coated area.

Prior art methods for reducing the drag encountered by a moving object such as a torpedo depend chiefly on carrying and ejecting a solution of long chain, high molecular weight, water soluble polymer into the turbulent boundary layer as the moving object speeds through the water. The technology advanced from carrying and ejecting the dissolved, highly concentrated solutions to making the solutions on board by mixing of the polymer with ingested sea water. The high viscosity of concentrated solutions limits the usable concentrations to those that can be pumped efficiently without unduly shearing the high molecular weight polymers. The prior art further advanced from the use of concentrated solutions to polymer slurries. The particle size of the polymers used in slurries must be very small for rapid solution. The fine powder must be suspended in a liquid in which it is insoluble and must not grow in particle size or agglomerate during storage. The liquid must not adversely affect the subsequent solubility of the suspended particles in water. The ejection of drag reduction material into turbulent boundary layers required pumping, mixing and metering devices; on board storage of materials (i.e., solutions or slurries etc); to be ejected and perforation of the torpedo hull. These systems inherently require space that could be used for more desirable purposes. Furthermore, they add weight to the existing system and contribute to the generation of noise. It is thus desirable to have systems which can be designed to use drag reduction material coatings which can be applied to the moving body with ease. Such coatings are one shot systems and they can be easily applied to a moving object-water interface before the object is put in the water or in motion. Unlike solutions or slurries, coatings do not require equipments and devices for dissolving and ejecting metered quantities of the materials into the boundary layer. The rate of solution is integrated into the coating composition, formulation and fabrication. The concentration in the boundary layer is also controlled by selected location, size and geometry of the coating applied to the surface of the moving body. The rate of solution accommodatingly increases with the speed of the moving body. The flow pattern around the moving body introduces and distributes the dissolved polymer into the boundary layer. However, the usefulness, areas of application and efficiency of drag reduction coatings developed to date are restricted because of the lack of high molecular weight polymer coatings and because of the high concentration, high viscosity and drag resistance at the coating-water interface of very high molecular weight water soluble polymers. The systems of prior art therefore use less efficient, relatively low molecular weight, rapidly soluble drag reduction polymers in an attempt to decrease the viscosity at the coating-water interface. They use coating formulations which are rapidly soluble in water at the stagnation and low velocity laminar flow areas of the streamlined nose section of a moving body such as a torpedo and/or limit the coated areas exposed to the turbulent flowing liquids. The solution is then swept into the turbulent boundary layer from which it proceeds downstream over the uncoated areas of the moving body. The use of low molecular weight rapidly soluble polymers limits the time a coated vehicle can be immersed in water before it is fired as well as it limits the operational life-time of such coatings. Immersion of the body prior to firing creates high viscosity areas adjacent to these coatings. Furthermore, it dissolves and swells the coating in stagnant water and increases surface roughness and rapid ablation when the moving body travels through the water at high velocities. Thus, in order to improve the present drag reduction systems using slurries or coatings, it is desirable to use high molecular weight polymers coatings which do not produce high concentration and high viscosity at the coating-water interface.

SUMMARY OF THE INVENTION

The coatings of subject invention possess low solubility and viscosity of a high molecular weight drag reduction polymer at and contiguous to the coating-water interface. The invention utilizes a high molecular weight drag reduction polymer that is an effective drag reducing material in exceedingly low concentrations (a few parts of the polymer in one million parts of water). The dissolved polymer is also an effective drag reducing material downstream of the coated area. These performances are accomplished by adding solid water-soluble materials as diluents in the solid polymer coating as solubility and viscosity reducers to aqueous solutions of very high molecular weight drag reduction non-ionic polymer such as polyethylene oxide. The solubility of the drag reduction polymer used and the viscosity of its solutions at the coating-water interface and contiguous areas are effectively reduced by the presence of the additives such as soluble salts like $K_2SO_4$. The magnitude of the effect is dependent on the valence of specific ions in the salt used, the ionic strength of the salt and the polymer-water solution and the hydrogen ion concentration of the aqueous solution of polymer and salt. The molded polymer matrix is a reservoir for physically including salts in quantities far beyond the amount of salt that can be dissolved in water or in aqueous solutions of the polymer. Loading the polymer with solid particles of soluble salts or nonelectrolytes mechanically dilutes the surface and volume concentration of the polymer in the coating. The close intimate proximity of the salt and the polymer creates a very highly concentrated salt solution of the polymer at the coating-water interface. The solubility and viscosity of the polymer in water is markedly reduced by the high salt concentration. This concentrated salt solution is diluted by the turbulent water flow as the solution is moved farther away from the coating-water interface. However, very dilute solutions of a very high molecular weight polymer (a few parts per million parts of water) effectively reduce turbulent drag. The high molecular weight polymer powders that are used to form the salt loaded polymer coatings are formulated with compatible selected anti-oxidants, lubricant, plasticizer and emulsifier additives. With these selected additives, the drag reduction properties of the aqueous solution of the polymers are not degraded by the temperature pressure molding cycles used to make or form the coatings. A few of the polyethylene oxide polymer powder systems which are used to mold coatings contained various concentration of selected salts such as NaCl, $Na_2CO_3$, $K_2SO_4$, and $MgSO_4$ as fillers. Formulations that mold well and have good mechanical strength are made with the polymer content as low as 31% by weight. Coatings with even lower amounts of polymers are possible.

A neutral salt such as $K_2SO_4$ is favored to avoid introducing corrosion problems for metal torpedo hulls and launching tubes. One object of this invention is to make coatings using high molecular weight polymers wherein the high drag reduction properties of the polymer are not degraded.

Still another object of subject invention is to make coatings using high molecular weight polymers and solid water-soluble materials as diluents in proper portions such that the coatings maintain drag reduction properties of the high molecular weight polymers used.

Still another object of this invention is to make high molecular weight polymer coating formulations which include materials that reduce the solubility and the viscosity of the polymer at and contiguous to the coating-water interface.

Still another object of the subject invention is to select a salt whose rate of solubility is compatible with the rate at which the polymer dissolves, so as to minimize the formation of a rough coating surface.

Still another object of subject invention is to make use of the differences in solubility characteristics of the drag reducing coating under static and dynamic conditions, i.e., the moving body when it is stationary and the condition when the body is in motion respectively.

Still another object of the subject invention is to introduce the selected salts as very fine particles to minimize the formation of a rough coating surface as the coating dissolves.

Still another object of the subject invention is to coat large sections of the torpedo hull without increasing the drag experienced by the vehicle while it travels through water. The location of the coated area is not limited to areas of stagnant or laminar flow such as the nose section. Areas that do not experience turbulent flow need not be coated.

Other objects, advantages and novel features of the invention will become apparent from the following detailed description of the invention when considered in conjunction with the accompanying drawings wherein:

BRIEF DESCRIPTION OF THE DRAWING

A single FIGURE shows a graphical representation of the reduction in torque due to addition of ionic salts before making a coating of a high molecular weight polymer such as polyethylene oxide.

DESCRIPTION OF A PREFERRED EMBODIMENT

Referring to the drawing, the single figure is a graphic representation of the test results for torque reduction measurements made by using a rotating disc coated with either coating A or B, both of which will be described presently.

The drag reduction effectiveness of each coating was determined by a conventional spinning disc apparatus. An electronically controlled laboratory permanent magnet DC motorgenerator provided a constant speed under variable torque conditions. It had a millivoltmeter having recordable output which was proportional to the torque and was designed to deliver torques up to 3.0 inch-pounds at constant speed of 3 to 1500 rpm (revolutions per minutes). The molded coating specimens were approximately 20 mils (1 mil − 10 −3 inch) thick. They were cut and bonded to completely cover both faces of a disc of diameter about 6 inches and 62 mils in thickness, preferably made of smooth finished flat stainless steel. The disc is part of a stirrer made by attaching a thin rigid steel rod thereto. The coatings were bonded to the disc by using uniformly thin layers of a spray of neoprene contact cement on each surface to be bonded. A roller was used to apply pressure to the outer faces of the coatings to form a strong bond between the coating and the metallic disc. The coating protruding over the edge of the metallic disc was trimmed off with a razor blade and the excess of adhesive was carefully removed with a cloth wet with a volatile water-soluble solvent such as acetone.

The relative difference in drag was determined for the uncoated and coated disc spinning in water at the same constant speed. The relative difference in drag was plotted as a % torque reduction of the coated and uncoated metallic disc spinning in water at a constant speed of 1500 rpm. A tank with approximately 4,000 gallons of water was used to decrease the concentration of the coating dissolved in the water while making torque measurements. A ten gallon per minute immersion water pump was used to uniformly and rapidly remove the material dissolving from the coating and redistribute it to a much deeper area of the water filled tank. The extent of contamination of the water with material from the coating was determined by measuring torque of the uncoated disc before and after a measurement was made with the disc coated with a specimen of drag reduction material coating formulations A or B. The water was drained and replaced by fresh water when it was unduly contaminated. The coated metallic disc was introduced into the water and its shaft was locked into the chuck of the motor-generator. The constant speed motor-generator was started 30 seconds after the introduction of the specimen in the water. The speed of the motor was quickly adjusted to 1500 revolutions per minute (rpm). The millivolt output of the equipment was read continuously on a digital millivoltmeter and recorded in 15 second time intervals. Total immersion periods of approximately 4–6 minutes were used to avoid dissolving the coating to bare metal and to avoid rapid contamination of the water and the need to drain and refill the tank.

Comparative test results demonstrated a marked increase in drag reduction of a completely coated surface due to the addition of a soluble salt to formulate a coating. As shown in curve a of the figure; torque reduction of 10–11% for a 4 minute test was achieved for the newly developed high molecular weight coating A. Coating formulation B is coating A modified by the addition of an equal amount of a solid water-soluble salt such as $K_2SO_4$. As shown by curve b of the same figure, torque reduction in case of the tests with coating B resulted in a torque reduction of 28% for the first 2.5 minutes of the test, 25% for the first 4 minutes of the test and 22% for the first 6 minutes of the test. The solutions of the salts used as additives for fabricating coating B were found to have no appreciable torque reduction property. Torque reduction is defined as the percentage ratio of the difference between the torque of the uncoated and coated disc and the torque of the uncoated disc.

Coating formulations A and B were used to demonstrate experimentally the improved drag reduction effectiveness due to incorporating a soluble salt as a filler of a drag reduction, non-ionic polymer coating. It should be noted that the invention is not limited to these formulations only. This example is given to demonstrate that by utilizing the new concepts described herein, superior drag reduction coating can be made. Coatings B differs from coating A in that coating B has soluble salts added to the coating A formula. The coating formulations had the same mold cycles for molding and their formulations are:

POLYMER COATING FORMULATION A 96 parts by weight-polyethylene oxide polymer powder of molecular weight $4 \times 10^6$ 15 parts by weight-polyethylene oxide polymer powder of molecular weight $9 \times 10^5$ 9 parts by weight — 4.8% by weight solution of 4,4-thio bis (6 tert butyl meta cresol) in polyoxyalkylene sorbitan monolaurate of theoretical molecular weight 1226

The first two powder ingredients were mixed until they were uniformly distributed and the liquid third component (an antioxidant dissolved in a material acting as a lubricant, plasticizer and an emulsifier) was added and mixed until it was uniformly distributed. A fraction of the mixture was uniformly distributed (in a compression mold cell) and molded by the following schedule to form approximately 20 mil thick specimens: 5 minutes preheated at 250° – 255° F while the mixture was between the mold platens at contact pressure. 10 minutes at 250 –255° and 580 psi pressure The contents of the mold were cooled while at pressure. The mold was opened and the molded specimen was removed.

POLYMER COATING FORMULATION B

This formulation consisted of equal weights of the contents of polymer coating formulation A in the same proportions as in the case of coating A, and powdered potassium sulphate ($K_2SO_4$) mixed until uniformly distributed. A fraction of the mixture was uniformly distributed in a compression mold cell and molded by the same schedule used for molding formulation A to form approximately 20 mil thick specimens.

Coating formulations A and B fabricated as described above were used for determining the effectiveness of the addition of salt on the drag reduction or torque reduction properties of a disc.

Obviously many modification and variations of the present invention are possible in the light of above teachings. It should be clearly understood that the above-mentioned example has been cited purely by way of example and not by way of limitation, particularly as to the choice of the solid watersoluble salt added to the coating formulation and the method and the mold cycle during the formulation of the coatings. Furthermore, the method of molding the mixture of the polymer and the additives under various temperature and pressure conditions can also be varied without deviating from the teachings of subject invention.

It is therefore understood that within the scope of the appended claims the invention may be practiced otherwise than as specifically described.

I claim:

1. A molded coating formulation for covering the outer surface of a body moving in water to reduce the drag encountered at and contiguous to the interface thereof, said coating formulation consisting essentially of 96 parts by weight polyethylene oxide polymer powder of molecular weight $4 \times 10^6$;

15 parts by weight polyethylene oxide polymer powder of molecular weight $9 \times 10^5$;

9 parts by weight 4.8 percent by weight solution of 4,4" thio-bis (6-tert-butyl meta cresol) in polyoxyalkylene sorbitan monolaurate of theoretical molecular weight 1226; and 120 parts by weight of a neutral water soluble salt.

2. The molded coating of claim 1 wherein said water soluble salt is $K_2SO_4$.

3. A method of making a molded coating for reducing the drag encountered by a moving body in water at and contiguous to the interface, said method comprising the steps of:

mixing uniformly 96 parts by weight of polyethylene oxide polymer powder of molecular weight $4 \times 10^6$, 15 parts by weight polyethylene oxide polymer powder of molecular weight $5 \times 10^5$, 9 parts by weight 48 percent solution of 4,4' thio-bis (6-tert-butyl) meta cresol) in polyoxyalkylene sorbitan monolaurate of theoretical molecular weight 1226 and 120 parts by weight of $K_2SO_4$ to form a mixture;

distributing uniformly said mixture in a mold cell;

heating said mixture in said mold cell to 250° F under pressure of 580 psi; and cooling said mold cell.

* * * * *